United States Patent [19]

Seki et al.

[11] Patent Number: 4,790,615
[45] Date of Patent: Dec. 13, 1988

[54] DEMULTIPLEXING AND/OR MULTIPLEXING OPTICAL CIRCUIT

[75] Inventors: Masafumi Seki; Yoshiyuki Hanada; Ryoichi Sugawara, all of Doshomachi, Japan

[73] Assignee: Nippon Sheet Glass Co., Ltd., Osaka, Japan

[21] Appl. No.: 21,756

[22] Filed: Mar. 4, 1987

[30] Foreign Application Priority Data

Mar. 6, 1986 [JP] Japan .................................. 61-49408
Jul. 23, 1986 [JP] Japan .................................. 61-173091

[51] Int. Cl.$^4$ ............................................. G02B 6/10
[52] U.S. Cl. .............................. 350/96.12; 350/96.11; 350/96.15
[58] Field of Search ............... 350/96.12, 96.15, 96.16, 350/163, 164, 316, 96.11; 370/1, 2

[56] References Cited

U.S. PATENT DOCUMENTS 4,693,544 9/1987 Yamasaki et al. ........... 350/96.12 X

FOREIGN PATENT DOCUMENTS 0171343 9/1984 Japan .......................................... 370/1
0198408 11/1984 Japan .................................. 350/96.15
0217315 10/1985 Japan .................................. 350/96.16

Primary Examiner—William L. Sikes
Assistant Examiner—John Ngo
Attorney, Agent, or Firm—Woodcock Washburn Kurtz Mackiewicz & Norris

[57] ABSTRACT

In a demultiplexing and/or multiplexing optical circuit of the invention, a groove for arranging a filter in an optical waveguide is arranged to be perpendicular to a pair of parallel opposing sides of a substrate for constituting the optical circuit. A plurality of demultiplexer and/or multiplexer can be formed simultaneously, and a high machining precision can be obtained relatively easily.

8 Claims, 8 Drawing Sheets

DEMULTIPLEXING AND/OR MULTIPLEXING OPTICAL CIRCUIT

BACKGROUND OF THE INVENTION

1. Field of the Invention:

The present invention relates to a demultiplexing and/or multiplexing optical circuit as a component to constitute a demultiplexer and/or multiplexer which is necessary in a wavelengthdivision multiplexing optical fiber communication system.

2. Description of the Prior Art:

Conventionally, as a demultiplexing and/or multiplexing optical circuit using a buried waveguide, a circuit having a configuration as shown in FIG. 1 is known. (For example, refer to the Institute of Electronics and Communication Engineers of Japan, "Characteristics of Guided-wave Multi-/Demultiplexer with Embedded Waveguides by Ion-Exchange Process", *Shingaku giho,* OQE86-1, 1986, pp. 1 to 8.)

Referring to FIG. 1, an optical waveguide 2 is formed by, e.g., ion exchange method in a transparent substrate 1 made of e.g., glass. The optical waveguide 2 has a higher refractive index than that of the transparent substrate 1. The optical waveguide 2 has an incident path 2A having one end at one side of the substrate 1, a transmitted light output path 2B, and a reflected light output path 2C branching from the incident path 2A at a branching portion 3. A demultiplexing filter 4A which passes (or reflects) a light having a specific wavelength and reflects (or passes) lights having other wavelengths is fitted in the branching portion 3. Bandpass filters 4B and 4C which pass lights having specific wavelengths are fitted in transmitted and reflected light output paths 2B and 2C, respectively.

Grooves 5A, 5B, and 5C are formed in the substrate 1 to cross the optical waveguide 2 at the branching portion 3 and at portions midway along the output paths 2B and 2C. The filters 4A, 4B, and 4C are fitted in the grooves 5A, 5B, and 5C.

Of these filters, the demultiplexing filter 4A is arranged such that the angle defined by the incident path 2A and the reflected light output path 2C is divided into halves by a normal to the surface of the filter 4A.

In the optical circuit having the above arrangement, assume that two lights having different wavelengths $\lambda 1$ and $\lambda 2$ are incident on the incident path 2A via an optical fiber or the like. Then, only the light having the wavelength $\lambda 1$ passes through the filter 4A at the branching portion 3, and lights having wavelengths other than $\lambda 1$ are rejected by the filter 4B to ensure demultiplexing. The light having the wavelength $\lambda 1$ is output from the substrate 1 through the transmitted light output path 2B. The light having the wavelength $\lambda 2$ that has been reflected by the demultiplexing filter 4A at the branching portion 3 is incident to the reflected light output path 2C and is output from the substrate 1 after lights having wavelengths other than $\lambda 2$ are cut by the filter 4C.

In the conventional demultiplexing and/or multiplexing optical circuit described above, the incident and transmitted light output paths 2A and 2B are formed parallel to a side 1A of the substrate 1. Thus, the groove 5A for receiving the demultiplexing filter 4A is inclined with respect to the side 1A of the substrate 1.

As described above, if the groove 5A must be inclined with respect to the side IA of the substrate 1, when the groove 5A for receiving the filter 4A is formed in a substrate 1, it must be done independently in units of substrates 1 for optical circuits by machining, resulting in a cumbersome operation and poor productivity.

Besides, it is hard to make inclined grooves precisely on a substrate. If the angles of fabricated grooves are not correct, additional loss at branching portions will increase considerably and the yield of demultiplexing and/or multiplexing optical circuits will inevitably decrease, and optical circuits having stable qualities cannot thus be obtained.

It is an object of the present invention to provide a stable-quality demultiplexing and/or multiplexing optical circuit in which the above-described conventional problems are solved, which can be machined easily, and which are thus suitable for mass production.

SUMMARY OF THE INVENTION

In a demultiplexing and/or multiplexing optical circuit according to the present invention, an optical waveguide, including branching portions for dividing an optical path into transmitting and reflecting optical paths, is formed in a substrate, a groove crossing the optical waveguide at the branching portions and a portion midway along one of the optical paths as needed is formed, and filters are fitted in the groove, the groove is perpendicular to a pair of opposing parallel sides of the substrate. In this case, considering the connecting operability and coupling loss of optical fibers, it is preferable that an arcuated bent portion is provided at an appropriate portion of the optical path so that the optical axis of the optical path at its end is perpendicular to the end of the substrate.

In the above demultiplexing and/or multiplexing optical circuit according to the present invention, the axis of the filter-fitting groove is perpendicular to the side of the substrate, as described above. Therefore, a plurality of optical waveguides having the same circuit patterns are formed in a large substrate base to be adjacent to each other. Grooving is performed by a single operation at a predetermined portion of the base. Then, a plurality of demultiplexing and/or multiplexing optical circuits having predetermined filter-fitting grooves can be formed at once only by cutting the substrate into same optical circuits.

Therefore, according to the present invention, simultaneous manufacture of a plurality of demultiplexer and/or multiplexers, which is conventionally impossible, can be easily accomplished. Furthermore, since the groove for receiving the filter is perpendicular to the side of the substrate, high machining precision can be ensured relatively easily.

DETAILED DESCRIPTION OF THE PREFERRED EMBODIMENTS

First to third embodiments of the present invention will be described in detail with reference to the accompanying drawings.

Figure 1:
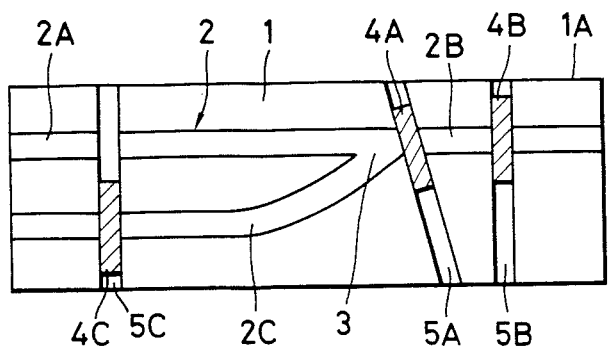
FIG. 1 is a plan view of an example of a conventional demultiplexing and/or multiplexing optical circuit.
Figure 2:
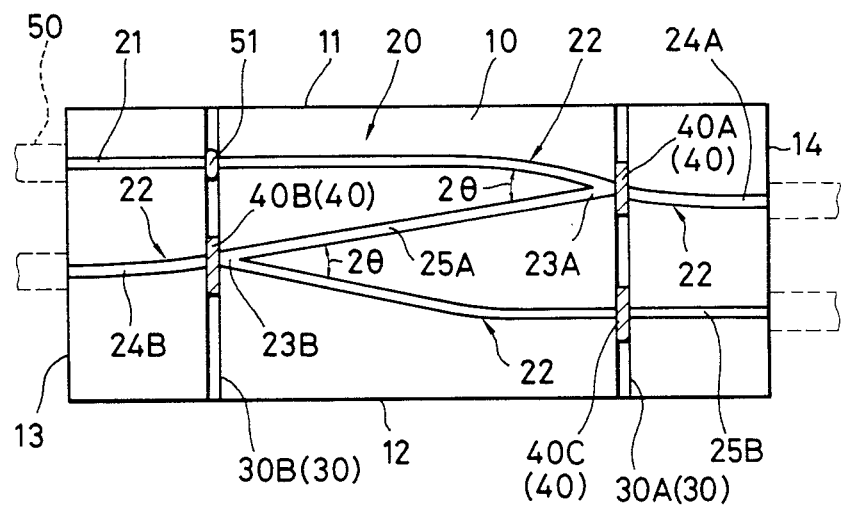
FIG. 2 is a plan view of the first embodiment of the present invention.

FIG. 2 is a plan view of a demultiplexing and/or multiplexing optical circuit according the first embodiment of the present invention. Referring to FIG. 2, a substrate 10, an optical waveguide 20, filter-fitting grooves 30, and interference filters 40 are provided. The substrate 10 constitutes a rectangle having opposing sides 11 and 12 parallel to each other and opposing ends 13 and 14 parallel to each other.

The optical waveguide 20 is formed by a known optical waveguide forming method, such as two-step ion exchange on a glass substrate 10 or soot deposition on an Si substrate 10. FIG. 2 shows a circuit pattern having three-wave demultiplexing and/or multiplexing functions.

The optical waveguide 20 has an incident path 21 parallel to the side 11 of the substrate 10. The incident path 21 extends to a first branching portion 23A through an arcuated bent portion 22 and is branched into first transmitted and reflected light output paths 24A and 25A. After passing the bent portion 22, the transmitted light output path 24A extends parallel to the side 11 of the substrate 10 and reaches the other end 14 of the substrate 10.

The first reflected light output path 25A extends to a second branching portion 23B and is branched into second transmitted and reflected light output paths 24B and 25B. The output paths 25A and 25B extending obliquely with respect to the sides 11 and 12 of the substrate 10 become parallel to the sides 11 and 12 of the substrate 10 near the ends 13 and 14, respectively, after they pass corresponding bent portions 22. Hence, the optical paths of the output paths 25A and 25B at the output ends are perpendicular to the ends 13 and 14 of the substrate 10.

The distance between the incident path 21 and the second transmitted light output path 24B at one end 13 of the substrate 10 is set to be equal to that between the first transmitted light output path 24A and the second reflected light output path 25B at the other end 14. The end of each of the incident path 21 and the respective output paths 24A, 24B, and 25B is connected to an optical fiber 50, or is directly connected to a light-emitting or light-receiving element.

Two filter-fitting grooves 30 are formed to extend along the entire width of the substrate 10 to be perpendicular to the sides 11 and 12 of the substrate 10. The sectional size of each groove 30 is, e.g., a width of 50 μm and a depth of 200 μm, so that its width is substantially the same as that of a filter to be used and that its bottom is located under the lower end of the optical waveguide 20.

One groove 30A crosses the optical waveguide 20 at the first branching portion 23A and a portion midway along the second reflected light output path 25B. At the branching portion 23A, the incident path 21 and the reflected light output path 25A form a constant angle $\theta$ with respect to the normal to the groove 30A. The second reflected light output path 25B and the groove 30A cross at a right angle.

The other filter-fitting groove 30B crosses the optical waveguide 20 at the second branching portion 23B and at a portion midway along the incident path 21. The angles defined by the optical waveguide 20 and the groove 30B are similar to those defined in the above-described case.

At the first branching portion 23A, a first demultiplexing filter 40A, e.g., a short-wavelength pass interference filter, is fitted and adhered in the groove 30A to cover the section of the optical waveguide 20. Similarly, a filter 40C for cutting the noise of output light, e.g., a 1.2-μm bandpass filter having 35 layers, is fitted in the groove 30A at a portion across the second reflected light output path 25B. Regarding the other groove 30B, a second demultiplexing filter 40B, e.g., a 1.3-μm bandpass filter having 23 layers, is fitted at the second branch portion 23B. No filter need be fitted in a portion of the incident path 21 at which the groove 30B crosses. Therefore, an optical adhesive 51 having the same refractive index as that of the optical waveguide 20 is filled in the groove 30B so as to optically connect the optical waveguide 20 separated at this portion.

In the above optical circuit, if each bent portion 22 of the optical waveguide 20 has too small a radius of curvature, a radiation loss results. Therefore, it is preferable that the radius of curvature is 5 mm at minimum, and more preferably within a range of 10 to 25 mm considering miniaturization of the circuit. If the angles $2\theta$ defined by the incident and reflected output paths at both branching portions 23A and 23B are set to be about 20°, good filter characteristics can be obtained.

Figure 3:
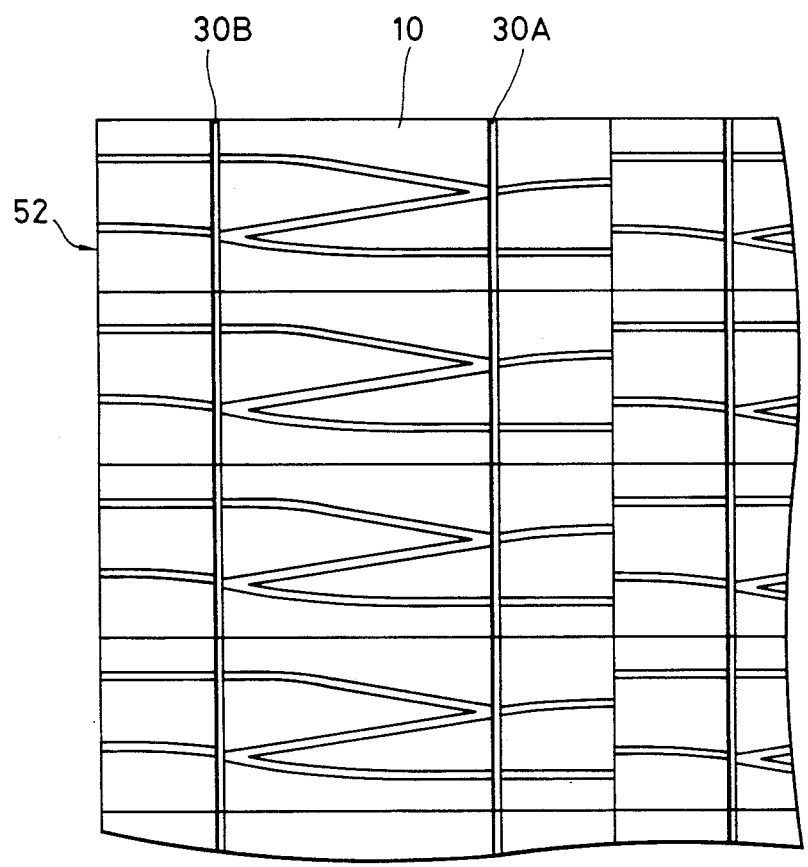
FIG. 3 is a plan view showing steps to manufacture the demultiplexing and/or multiplexing optical circuit according to the first embodiment of the present invention.

The optical circuit of the first embodiment having the above arrangement can be efficiently manufactured as shown in FIG. 3. More specifically, a plurality of optical waveguides having predetermined circuit patterns are formed in a large substrate base 52 made of, e.g., glass. Filter-fitting grooves 30A and 30B are formed to extend from one end to the other of the base 52 by a machining means such as a dicing saw. Then, the base 52 is cut into substrate members corresponding to respective circuit substrates 10.

When the present invention is practiced, it is preferable that the circuit pattern is designed such that the number of portions for cutting the optical waveguide 20 by the grooves 30, other than the portions for receiving the filters 40, is minimized.

Figure 4:
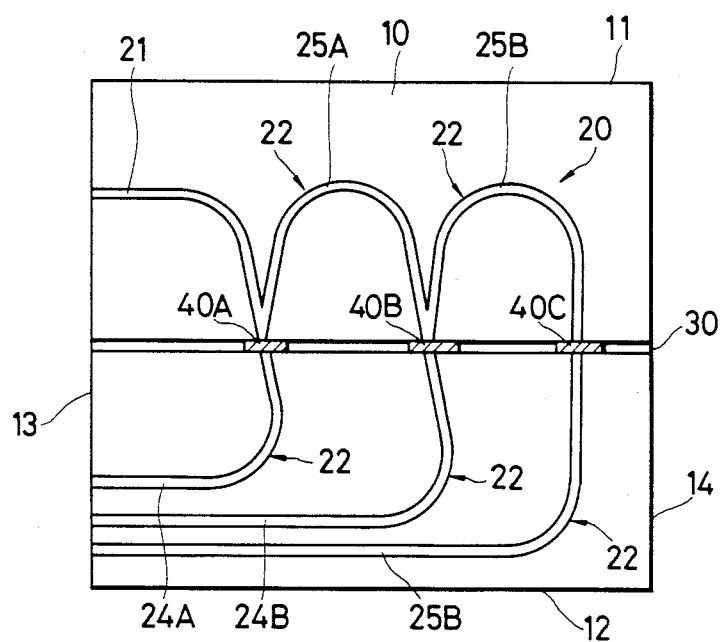
FIG. 4 is a plan view showing the second embodiment of the present invention.

For example, the circuit pattern can be designed as the second embodiment shown in FIG. 4. More specifically, according to the second embodiment, all of an incident path 21 and output paths 24A, 24B, and 25B are parallel to sides 11 and 12 of a substrate 10. A groove 30 is also parallel to the sides 11 and 12 of the substrate 10. Bent portions 22 are formed in the optical waveguide 20 to bent it substantially through 180° and 90°. As a result, the groove 30 crosses only a portion of the optical waveguide 20 for receiving filters 40, and the optical axis of each of optical paths 21, 24A, 24B, and 25B, that face the end 13 of the substrate 10, can be set perpendicular to the end 13.

In the above arrangement, since the ends of all the optical paths 21, 24A, 24B, and 25B are centralized to the end 13 of the substrate 10, only a single optical fiber array need be connected.

A third embodiment of the present invention will be described with reference to FIG. 5. Prior to the explanation on the third embodiment, a bandpass filter used in the third embodiment will be described with reference to FIGS. 6A to 9B.

FIGS. 6A to 8B are graphs showing wavelength characteristics of the band widths when three types of band pass filters Nos. 1 to 3 are inserted in the optical path.

Figure 6A:
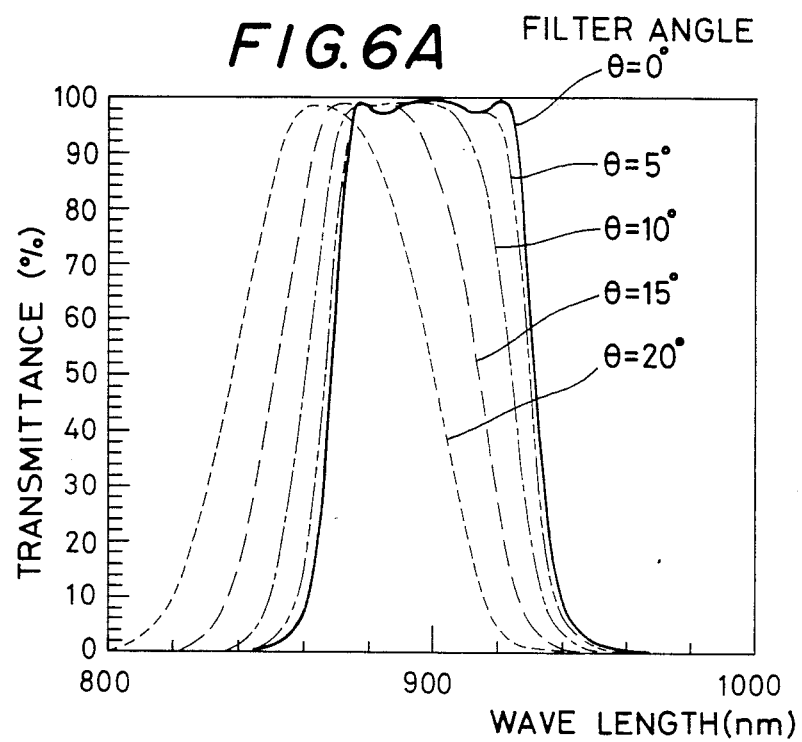
FIGS. 6A to 8B are graphs showing wavelength characteristics of three types of filters having different layer configurations.
Figure 6B:
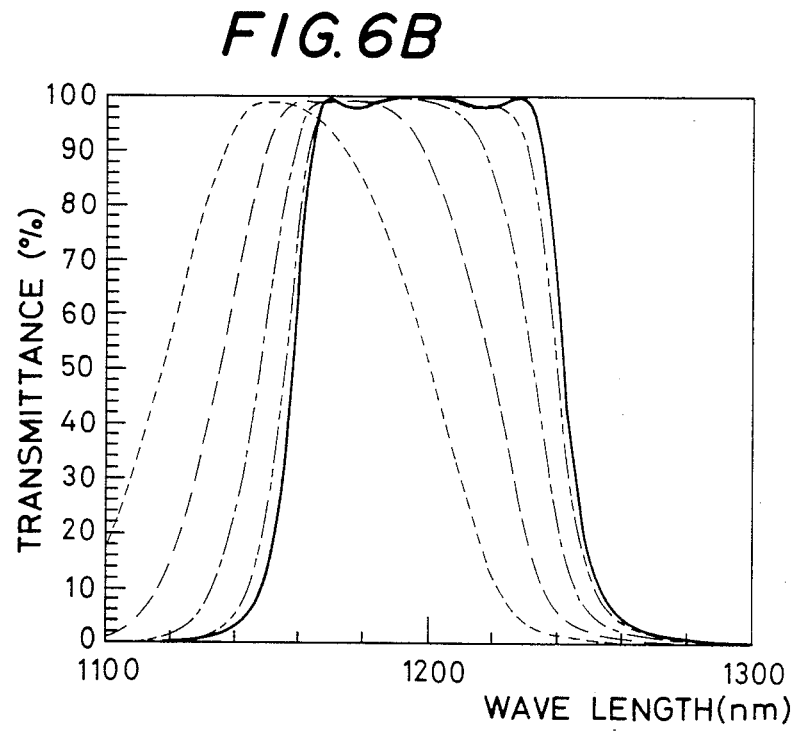
Figure 7A:
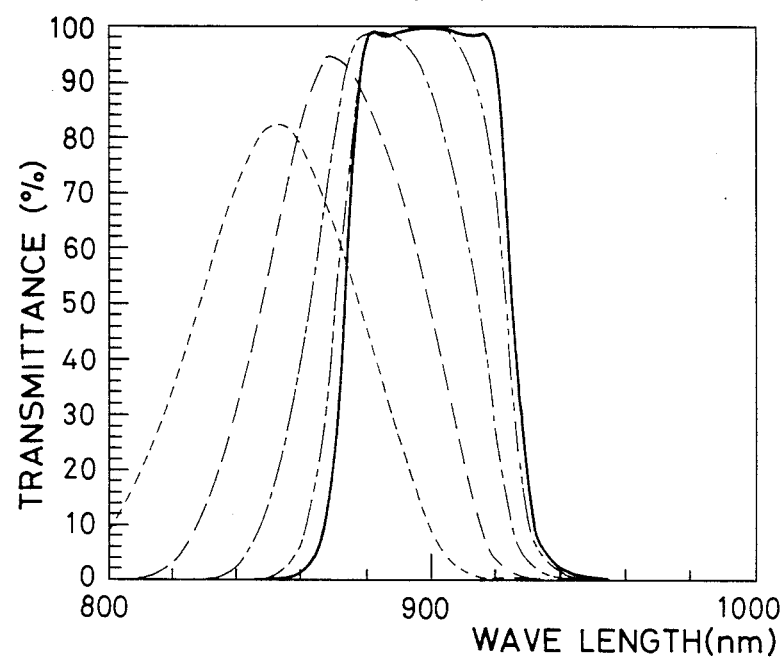
Figure 7B:
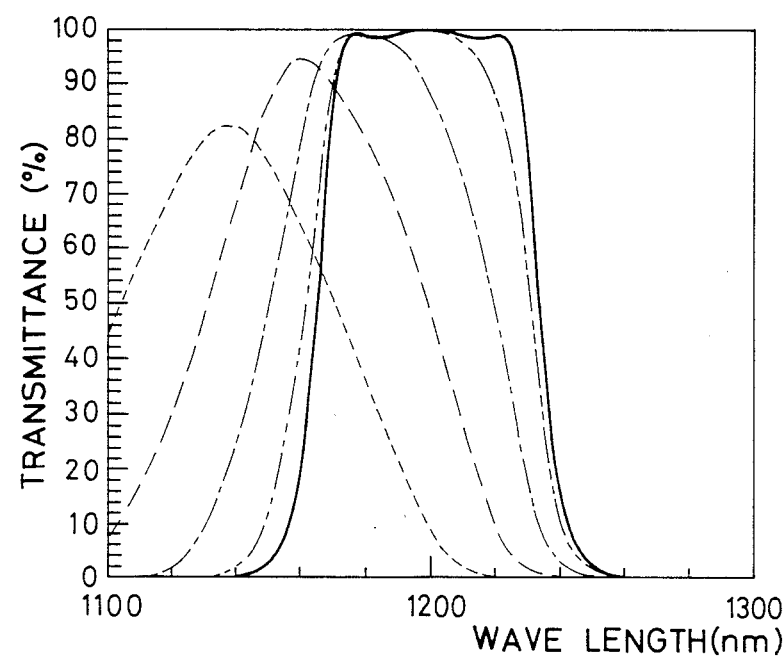
Figure 8A:
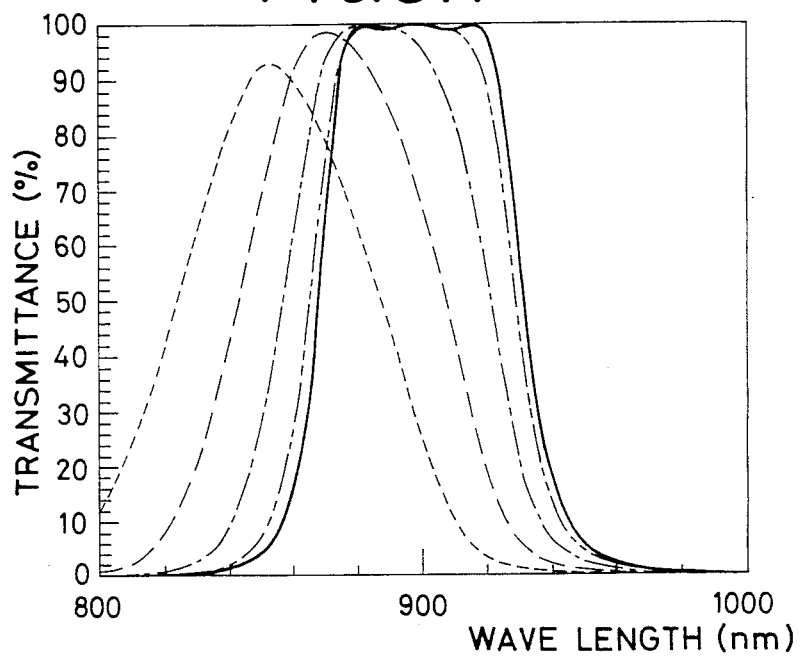
Figure 8B:
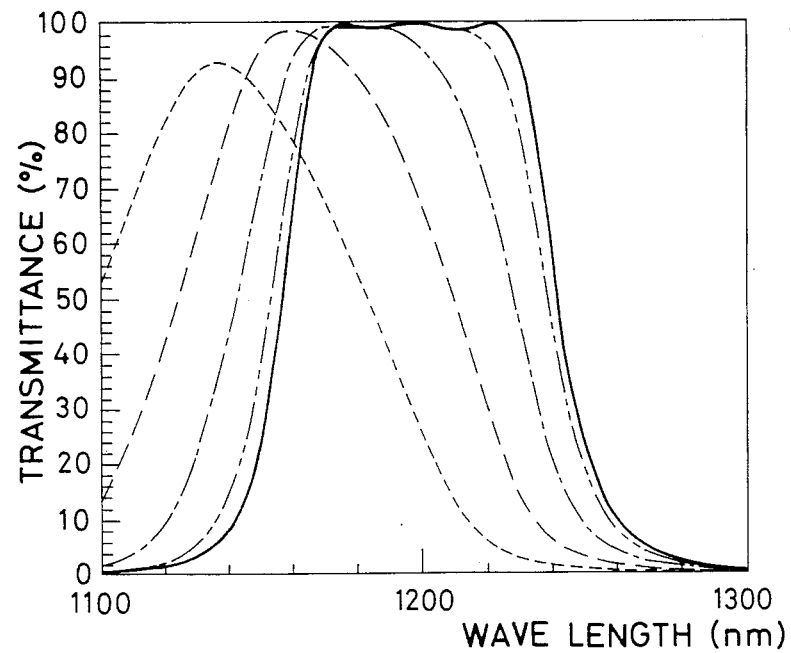

FIGS. 6A and 6B, 7A and 7B, and 8A and 8B correspond to filters Nos. 1, 2, and 3, respectively. The layer configurations of the respective filters are as follows:

| No. 1: | HLH(3HLHLHL3H)³HLH | 23 layers |
| No. 2: | HLH(2LHLHLHLH2L)³HLH | 31 layers |
| No. 3: | HLHL(LHLHLHLHL)²LHLH | 23 layers | where H indicates a dielectric layer having a refractive index of 2.2 and a layer thickness corresponding to $\lambda/4$, and L indicates a dielectric layer having a refractive index of 1.5 and a layer thickness corresponding to $\lambda/4$. FIGS. 6A, 7A, and 8A show cases wherein the central wavelength is 900 nm, and FIGS. 6B, 7B, and 8B show cases wherein the central wavelength is 1,200 nm. The filter angles $\theta$ defined by the plane normal to the filter and the optical path are 0°, 5°, 10°, 15°, and 20°. The characteristics of the filters having these filter angles are indicated by a solid line, an alternate long and two short dashes line, an alternate long and short dash line, a broken line, and a dotted line in this order. In this embodiment, a buried optical waveguide manufactured by an electric-field assisted 2-step ion exchange process and having a substantially circular section is used. According to the refractive index profile of this optical waveguide, the refractive index is maximum at the central portion and decreases gradually toward the outer surface of the optical waveguide.

With filter No. 1, the degradation in maximum transmittance is small and the decrease in transmission band width is also small, while with filters Nos. 2 and 3, both the degradation in maximum transmittance and decrease in transmission band width are large. A required transmission band width depends on the specification of the transmission system. When the variation in wavelength of a light-emitting element to be used depending on a temperature change and that depending on a manufacturing condition are considered, the band width is preferably about 30 nm or more at a wavelength of 800 to 900 nm, and about 50 nm or more at a wavelength of 1,200 to 1,300 nm. Table 1 shows whether the respective filters operating in the waveguide satisfy the above band width conditions or not when they have a transmittance of 90% or more (a transmittance lower than the maximum transmittance by 10%).

TABLE 1

| Filter No. | Filter Angle | Wavelength 800 to 900 nm | Wavelength 1,200 to 1,300 nm |
|---|---|---|---|
| 1 | 10° | Yes | Yes |
|   | 13° | Yes | Yes |
| 2 | 10° | No | No |
|   | 13° | No | No |
| 3 | 10° | Yes | No |
|   | 13° | Yes | No |

It is found from Table 1 that filter No. 1 is optimal, filter No. 3 is effective only for a wavelength of 800 to 900 nm, and filter No. 2 is not suitable. From FIGS. 6A to 8B, the results of Table 1, and other theoretical and experimental studies, it is apparent that, generally, the wider the 90% band width when a filter is arranged in an optical path at a filter angle $\theta=0°$, the smaller the degradation in filter characteristics when the filter is arranged at a filter angle $\theta>0°$.

Table 2 shows whether the 90% transmittance band width becomes 50 nm or more at a wavelength of 800 to 900 nm and 70 nm or more at a wavelength of 1,200 to 1,300 nm when $\theta=0°$.

TABLE 2

| Filter No. | Wavelength 800 to 900 nm | Wavelength 1,200 to 1,300 nm |
|---|---|---|
| 1 | 50 nm or more | 70 nm or more |
| 2 | less than 50 nm | less than 70 nm |
| 3 | 50 nm or more | less than 70 nm |

Comparison between the results of Tables 1 and 2 shows their correspondence.

From the above results and other studies, it is apparent that, in order to determine whether or not a certain filter is suitable, the 90% transmittance band width at a filter angle $\theta=0°$ of a filter in an optical path can be used, and that a suitable filter may hence have a band width of 50 nm or more at a wavelength of 800 to 900 nm and 70 nm or more at a wavelength of 1,200 to 1,300 nm.

Regarding the number of layers, a relatively small number of layers of about 23 is appropriate.

Figure 9A:
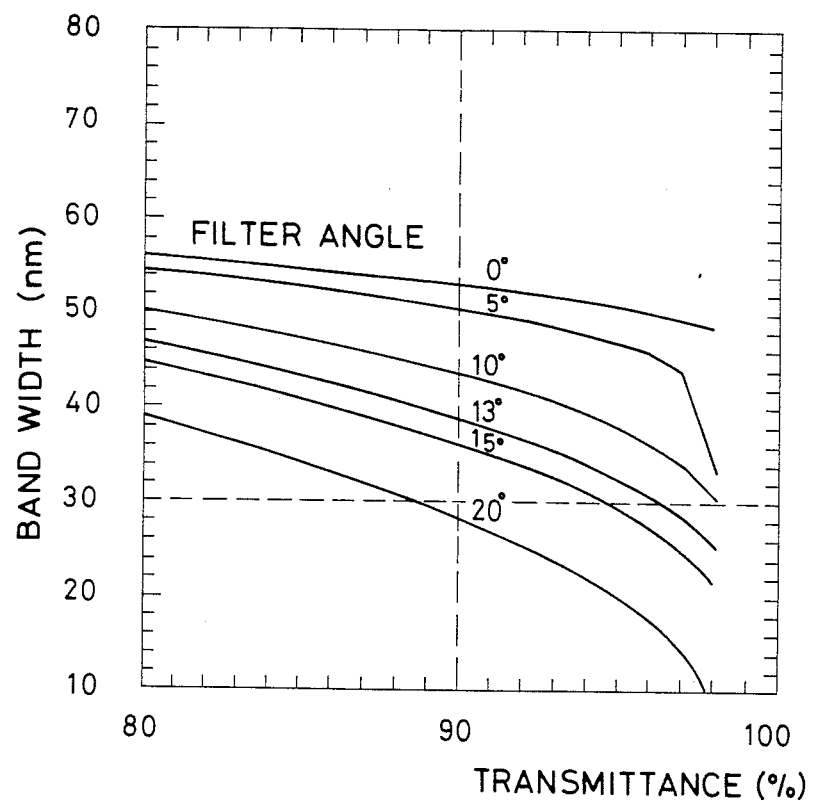
FIGS. 9A and 9B are graphs showing the relationship between the transmittance and the band width of one type of the filters described above.
Figure 9B:
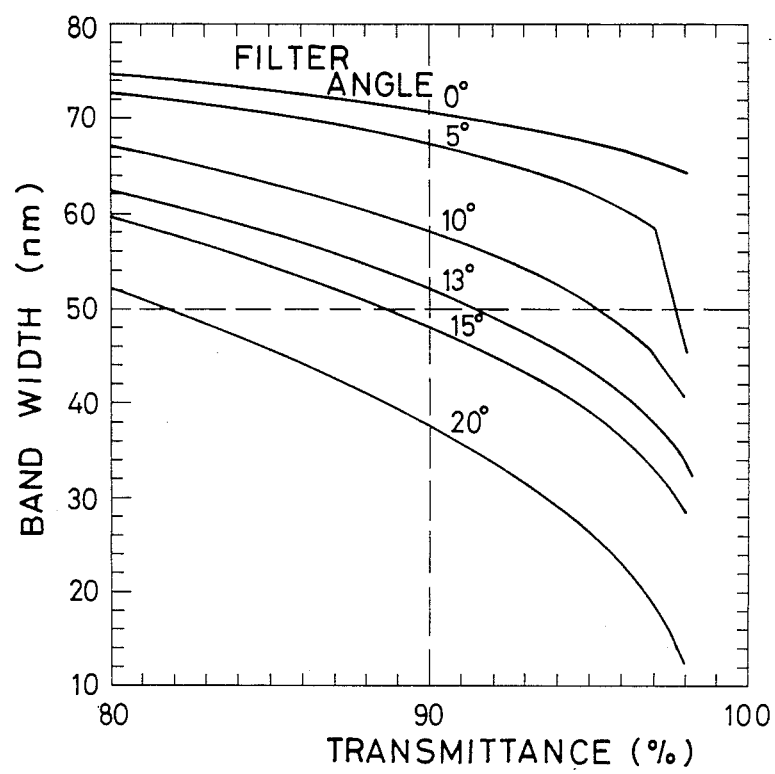

FIGS. 9A and 9B show a relationship between the band width and the transmittance when the angle of filter No. 1 having preferable characteristics is changed. FIGS. 9A and 9B show cases wherein the central wavelengths are 900 nm and 1,200 nm, respectively. When the conditions of a band width of 30 nm for the central wavelength 900 nm and that of 50 nm for the central wavelength 1,200 nm are to be satisfied simultaneously, a transmittance of 90% or more cannot be obtained if the filter angle $\theta \geq 15°$, while a transmittance of 90% or more can be obtained if the filter angle $\theta \geq 13°$. Similarly, a transmittance of 95% or more can be obtained if the filter angle $\theta \leq 10°$. However, this range of $\theta$ is not practical since $\theta$ becomes a smaller value if another unsuitable filter, e.g., filter No. 2 or 3 described above, is used.

From the results of FIG. 9 and other theoretical and experimental studies, it is apparent that the tolerance limit of the filter angle $\theta$ is 13° from the viewpoint of practical use, and that a filter angle $\theta \geq 15°$, as in a conventional demultiplexing and/or multiplexing optical circuit, falls far outside the range to obtain theoretical performance and is thus not preferable at all.

Table 3 shows the 90% band width obtainable with filter No. 1 with good characteristics described above. A filter angle 8 can be determined from Table 3.

TABLE 3

| Filter Angle $\theta$ | Band Width Central Wavelength | |
|---|---|---|
|  | 900 nm | 1,200 nm |
| 0° | 54 | 71 |
| 5° | 50 | 67 |
| 10° | 44 | 58 |
| 13° | 39 | 52 |
| 15° | 36 | 48 |
| 20° | 28 | 37 |

Figure 5:
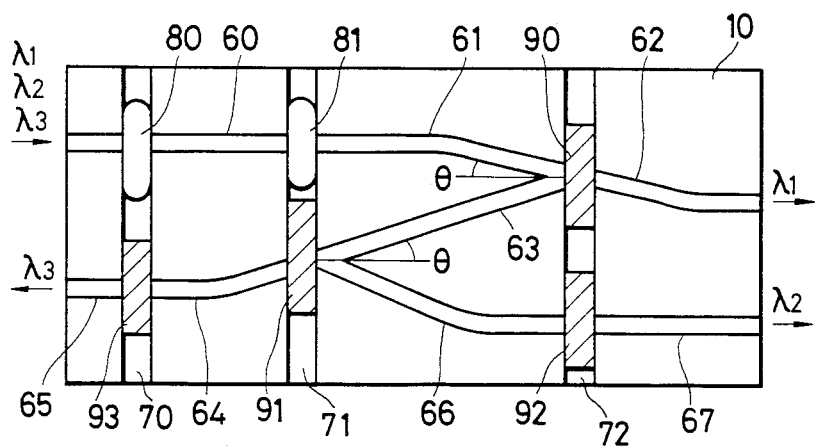
FIG. 5 is a plan view showing the third embodiment of the present invention.

FIG. 5 is a plan view of a third embodiment of the present invention. Optical paths 60 to 67 for constituting a buried-type optical waveguide are formed in a predetermined circuit pattern in a glass plate substrate 10. Grooves 70 to 72 are formed at respective portions of the surface of the substrate 10 to cross the optical waveguide. Interference filter groups 90 to 93 are fitted in the groves 70 to 72, respectively.

The substrate 10 is made of a glass containing, e.g., $SiO_2$ and $B_2O_3$ as major matrix forming oxides and a small amount of alkali ions for ion exchange. A mask having an aperture corresponding to the predetermined circuit pattern is formed on the glass substrate 10 by photolithography or the like. Ions having a valence of 1, e.g., T1, which contribute to the increase in refractive index of glass, are diffused through the mask aperture by the first ion exchange with the alkali ions in an electric field. Ions which contribute to the decrease in refractive index of the glass are diffused by the second ion exchange. The optical paths 60 to 67 are thus formed.

The optical paths 60 to 67 formed in the above method have substantially circular sections and refractive index profiles wherein a refractive index decreases gradually from the center to the outer surface of the respective optical path. These optical paths 60 to 67 are coupled with optical fibers at a low coupling loss.

The grooves 70 to 72 are formed to be substantially parallel to the ends of the substrate 10 and have, e.g., a width of about 40 μm and a depth of about 200 μm.

The optical paths 61 and 63 intersect each other at the groove 72 at an incident angle $\theta = 10°$. The optical paths 63 and 66 intersect each other at the groove 71 at an incident angle $\theta = 10°$. The left-side portions of the optical paths 61 and 64 and the right-side portions of the optical paths 62 and 66 are substantially parallel to the longer sides of the substrate 10. The right- and left-side portions of the optical paths 61 and 62 extend substantially on a straight line. The optical path 63 and the right-side portion of the optical path 64 extend substantially on a straight line.

A short-wavelength pass filter 90 is inserted at a portion of the groove 72 at which the ends of the optical paths 61 to 63 are located. A bandpass filter 92 is inserted between the optical paths 66 and 67. A bandpass filter 91 is inserted at a portion of the groove 71 at which the ends of the optical paths 63, 64, and 66 are located. A bandpass filter 93 is inserted at a portion of the groove 70 at which the end of the optical path 64 is located.

The short-wavelength pass filter 90 and the band pass filters 91 to 93 are thin plates having thicknesses of not more than 40 μm and are fixed in the grooves 70 to 72 by an optical adhesive. The short-wavelength pass filter 90 has a high transmittance for the entire wavelength range of 800 and 900 nm and has a rejection band attenuation of 30 dB or more for a wavelength of 1,200 to 1,300 nm. The short-wavelength pass filter 90 is used to divide only a beam having a wavelength λ1 from mixed lights having wavelengths of λ1=890 nm, λ2=1,200 nm, and λ3=1,300 nm that propagate through the optical paths 60 and 61. The light having the wavelength λ1 is guided to the optical path 62. The bandpass filter 91 is used for demultiplexing lights having wavelengths λ2 and λ3. In this case, in order to obtain desired demultiplexing characteristics, filter No. 1 described above is used at a filter angle $\theta = 10°$.

Filter No. 1 was manufactured to have a central wavelength of λ3 and a configuration as described above. The refractive indexes of the H and L layers were set to 2.2 and 1.5, respectively. $TiO_2$ was used as a deposition material for an H layer. Manufacturing conditions such as a deposition rate and a substrate temperature were optimized so that the H layer had a refractive index of 2.2 which is lower than that of a bulk substrate. In this case, a band width of 55 nm or more was obtained at a transmittance of 92%, and the rejection band attenuation for a wavelength deviated from a central wavelength by 100 nm was 28 dB.

The bandpass filters 92 and 93 are used for receiving lights having central wavelengths of λ2 and λ3, and the lights are incident on the filters 92 and 93 at a right angle. Since the filter angle $\theta$ of the filters 92 and 93 is $\theta = 0°$, the degradation in characteristics due to the increase in angle of the incident light is very small and does not depend so much on the layer configuration of each filter.

As the band pass filters 92 and 93, filters which had transmission band width of 60 to 65 nm at a transmittance of 95% and their rejection band attenuation for a wavelength deviated from a central wavelength by 100 nm was 30 dB, were used. The filter angles $\theta$ of the bandpass filters 92 and 93 can be other than 0°. However, $\theta \leq 7°$ is preferable in order to prevent a decrease in band width. Optical adhesives 80 and 81 are filled at portions of the grooves 70 and 71 at which the optical paths 60 and 61 are located so as to prevent light leak loss by separation of the optical paths 60 and 61.

In the third embodiment, when mixed light of three wavelengths of λ1, λ2, and λ3 is incident in the input optical path 20, a light having the wavelength λ1 passes through the short-wavelength pass filter 90 and is guided to the output optical path 62. The lights having wavelengths λ2 and λ3 are reflected by the filter 90, propagate in the optical path 63, and reach the bandpass filter 91. Of these lights, the light having the wavelength λ2 is reflected by the filter 91, propagates through the optical path 66, passes through the bandpass filter 92, and is output from the end of the output optical path 67. The beam having the wavelength λ3 passes the filter 91 and the bandpass filter 93 and is output from the end of the output optical path 65 to outside the substrate 10.

In this manner, the mixed light having wavelengths of λ1, λ2, and λ3 is guided into the different optical paths 62, 67, and 65 depending on the wavelengths.

In the third embodiment, the insertion losses of the respective channels were 2 dB or less for the central wavelengths λ1, λ2, and λ3 and were 2.5 dB or less for the entire band width (35 nm for the channel of the wavelength λ1 and 55 nm for the channels of the wavelengths λ2 and λ3). The far-end crosstalk attenuation was 30 dB for the channel for the wavelength λ1, 45 dB for the channel of the wavelength λ2, and 60 dB or more for the channel of the wavelength λ3.

In the above explanation, the function of the third embodiment used as a demultiplexing optical circuit is described. The optical circuit of the third embodiment can be used as a multiplexing optical circuit or a bidirectional demultiplexing and/or multiplexing optical circuit. In the latter case, the near-end crosstalk attenuation was 70 dB or more for the respective channels.

When the optical circuit of the third embodiment is used as a multiplexing optical circuit or a demultiplexing and/or multiplexing optical circuit, the filter 92 or 93 other than the filters 90 and 91 for performing demultiplexing by transmittance or reflection can be omitted as needed.

What is claimed is:

1. A demultiplexing and/or multiplexing optical circuit wherein an optical waveguide, including branching portions for dividing an incident optical path into transmitting and reflecting optical paths, is formed in a substrate, a groove for crossing said optical waveguide and said branching portions and a portion midway along one of said optical paths as needed is formed, and filters are fitted in said groove, and wherein said optical waveguide is embedded in said substrate, said groove is formed from one of a pair of opposing parallel sides of said substrate to the other thereof straight and perpendicularly thereto, and a filler having a refractive index greater than one, is filled in a portion of said groove where said groove crosses said optical waveguide and said filter is not fitted.

2. A circuit according to claim 1, wherein said optical waveguide has a circuit pattern such that at least one of said branching portions and at least one of said optical paths use said groove in common.

3. A circuit according to claim 1, wherein said optical waveguide has a circuit pattern such that all portions for receiving said filters use said groove in common.

4. A circuit according to claim 1, wherein an arcuated bent portion is provided to an optical path obliquely intersecting said groove, and an optical axis of said optical path is, at each end of said substrate and in the vicinity of said each end, perpendicular to said each end of said substrate.

5. A circuit according to claim 1, wherein the half of an angle defined by said incident optical path and said reflecting optical path is not more than 13°.

6. A circuit according to claim 1, wherein at least one of said filters is a bandpass filter having a 90% transmittance band width of not less than 50 nm for a wavelength of 800 to 900 nm and not less than 70 nm for a wavelength of 1,200 to 1,300 nm in a state wherein said filter is inserted into an optical waveguide with its normal coinciding with the optical axis of said optical path.

7. A circuit according to claim 1, wherein said optical path has a refractive index gradient in a radial direction within a section thereof.

8. A demultiplexing and/or multiplexing optical circuit wherein an optical waveguide, including branching portions for dividing an incident optical path into transmitting and reflecting optical paths, is formed in a substrate, a groove for crossing said optical waveguide at said branching portions and a portion midway along one of said optical paths as needed is formed, and filters are fitted in said groove, and wherein said optical waveguide is embedded in said substrate, said groove is formed from one of a pair of opposing parallel sides of said substrate to the other thereof straight and perpendicularly thereto, a filler, having a refractive index greater than one, is filled in a portion of said groove where said groove crosses said optical waveguide and said filter is not fitted, and at least one of said filters has a 23-layer structure indicated by HLH (3HLHLHL3H)$^3$HLH where H is a layer having a relatively high refractive index and a layer thickness corresponding to $\lambda/4$ and L is a layer having a relatively low refractive index and a layer thickness corresponding to $\lambda/4$.

* * * * *

UNITED STATES PATENT AND TRADEMARK OFFICE
CERTIFICATE OF CORRECTION

PATENT NO. : 4,790,615

DATED : December 13, 1988

INVENTOR(S) : Seki et al.

It is certified that error appears in the above-identified patent and that said Letters Patent is hereby corrected as shown below:

Column 6, line 38 please change "$\theta \geq 13°$" to --$\theta \leq 13°$--.

Signed and Sealed this

Sixteenth Day of May, 1989

*Attest:*

DONALD J. QUIGG

*Attesting Officer*

*Commissioner of Patents and Trademarks*